(12) United States Patent
Heuser (10) Patent No.: US 11,085,492 B2
(45) Date of Patent: Aug. 10, 2021

(54) ROLLER BEARING

(71) Applicant: Vestas Wind Systems A/S, Aarhus N. (DK)

(72) Inventor: Lutz Heuser, Velbert (DE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/766,853

(22) PCT Filed: Oct. 25, 2018

(86) PCT No.: PCT/DK2018/050270
§ 371 (c)(1),
(2) Date: May 26, 2020

(87) PCT Pub. No.: WO2019/105516
PCT Pub. Date: Jun. 6, 2019

(65) Prior Publication Data
US 2020/0300300 A1    Sep. 24, 2020

(30) Foreign Application Priority Data
Nov. 28, 2017    (DK) .......................... PA 2017 70893

(51) Int. Cl.
*F16C 33/58* (2006.01)
*F16C 19/36* (2006.01)
*F16C 33/60* (2006.01)

(52) U.S. Cl.
CPC .......... *F16C 33/583* (2013.01); *F16C 19/364* (2013.01); *F16C 33/605* (2013.01); *F16C 2226/74* (2013.01); *F16C 2360/31* (2013.01)

(58) Field of Classification Search
CPC .... F16C 19/364; F16C 33/583; F16C 33/605; F16C 33/66; F16C 2226/74; F16C 2360/31
See application file for complete search history.

(56) References Cited

U.S. PATENT DOCUMENTS 1,865,796 A * 7/1932 Seifarth .................. F16C 19/38
384/560
1,992,682 A    2/1935 Walters
(Continued)

FOREIGN PATENT DOCUMENTS

CN    203395010 U    1/2014
CN    203717638 U    7/2014
(Continued)

OTHER PUBLICATIONS

European Patent Office, International Search Report and Written Opinion in PCT Application No. PCT/DK2018/050270, dated Jan. 17, 2019.
(Continued)

*Primary Examiner* — Phillip A Johnson
(74) *Attorney, Agent, or Firm* — Wood Herron & Evans LLP (57) ABSTRACT

A bearing ring for a taper roller bearing defining a guiding flange (36, 110) and a raceway (112), wherein the bearing ring comprises a retainer element (77, 120, 124) that is removably engageable with the raceway. Embodiments of the invention also relate to a roller bearing assembly comprising such a bearing ring, and wind turbine arrangements incorporating such a roller bearing assembly.

18 Claims, 8 Drawing Sheets

(56) References Cited

U.S. PATENT DOCUMENTS

| | | | | |
|---|---|---|---|---|
| 3,420,589 A | * | 1/1969 | Williams | F16C 19/225 384/620 |
| 4,350,398 A | | 9/1982 | Schulz et al. | |
| 2008/0226214 A1 | * | 9/2008 | Glas | F16C 19/364 384/560 |

FOREIGN PATENT DOCUMENTS

| | | | | |
|---|---|---|---|---|
| CN | 106030134 A | | 10/2016 | |
| DE | 2442767 A1 | | 3/1976 | |
| DE | 2718212 A1 | | 11/1978 | |
| DE | 102010053349 A1 | * | 6/2012 | F16C 33/605 |
| DE | 202016103233 U1 | | 7/2016 | |
| EP | 2913547 A1 | | 9/2015 | |
| FR | 2407388 A1 | | 5/1979 | |
| GB | 2199621 A | | 7/1988 | |
| GB | 2410773 A | * | 8/2005 | F16C 19/225 |
| JP | 2006097798 A | | 4/2006 | |
| JP | 2006322504 A | | 11/2006 | |
| JP | 2007205456 A | | 8/2007 | |
| JP | 2008281121 A | | 11/2008 | |
| JP | 2008281121 A | * | 11/2008 | F16C 33/605 |
| JP | 2010101369 A | * | 5/2010 | F16C 33/513 |
| WO | 2005075844 A1 | | 8/2005 | |
| WO | 2011036997 A1 | | 3/2011 | |

OTHER PUBLICATIONS

Danish Patent and Trademark Office, Search and Examination Report in PA 2017 70893, dated Apr. 23, 2018.

China National Intellectual Property Administrations, First Notification of Office Action in CN Application No. 201880087367.8, dated May 8, 2021.

* cited by examiner

ROLLER BEARING

TECHNICAL FIELD

The invention relates to a roller bearing, roller bearing assembly, and components of such bearings. Particularly, though not exclusively, the invention relates to a roller bearing that is suited for use in high load applications such as a wind turbine. The invention also extends to a wind turbine and a wind turbine drive train that incorporates such a roller bearing.

BACKGROUND

Roller bearings generally include a set of rollers carried between an inner raceway and an outer raceway. Due to the larger contact area of the rolling elements compared to ball bearings, roller bearings are generally favoured in high load applications. One type of roller bearing is the 'taper' or 'tapered' roller bearing. In tapered roller bearings (TRB), the inner and outer ring raceways are segments of cones and the rollers are tapered so that the conical surfaces of the raceways, and the roller axes, if projected, would all meet at a common point on the main axis of the bearing. Through this geometry the motion of the cones remains coaxial, with no sliding motion between the raceways and the rollers.

This conical geometry creates a linear contact patch which permits greater loads to be carried than e.g. with ball bearings, which have point contact. For this reason, single row TRBs as well as unit matched TRBs will be considered more and more in automotive and industrial heavy duty applications as they belong to the most reliable and robust types of roller bearing.

The rollers are stabilized and restrained by a guiding flange on the inner ring, against which their large end slides, whereas their small end is restrained by a smaller retaining wall.

The components of the TRB may be split up into two parts, the cup (which is the outer ring) and the cone assembly consisting of the inner ring, the rollers, and a cage that retains & evenly spaces the rollers. Internal clearance is established during mounting by the axial position of the cone relative to the cup, although preloaded installations without clearance are common.

Roller bearings are critical components of heavy-duty applications and are typically machined from hardened bearing steel to maximise durability. It will be appreciated therefore that the machining processes related to the manufacture of roller bearings are time consuming and expensive. Different sized bearings require separate production processes in order to produce matched sets of inner and outer raceways, and so this limits production efficiency. It is with a view to improving this situation that the invention has been devised.

One specific place where use of TRB is found is within the wind turbine industry. Although many different types of wind energy generators exist today, the most common type is the horizontal axis wind turbine or "HAWT". HAWTs, hereinafter simply 'wind turbines', are in widespread use in on-shore and off-shore settings. An example of use in a wind turbine would be as a main bearing, for which reason focus within this application is put on this to give a context; however, it should not be considered limiting.

SUMMARY OF THE INVENTION

In accordance with the invention, there is provided a bearing ring for a roller bearing defining a guiding flange and a raceway, wherein the bearing ring comprises a retainer element that is removably engageable with the raceway.

The invention also extends to roller bearing assembly comprising an inner ring, an outer ring, and a plurality of rolling elements, wherein at least one of the inner ring or the outer ring is a bearing ring as defined above.

Beneficially, the invention provides for the creation of a bearing 'platform' which makes possible a family of different bearings to satisfy different dynamic and static load ratings, speed limits and stiffness rates, with the same basic configuration of inner and outer rings, also known as cups and cones. The removable retainer element can be positioned at different locations on the bearing ring that modifies or adjusts the raceway width so as to accommodate different sized rolling elements to target the specific requirements of a particular application.

The invention also provides manufacturing benefits. For instance, an inner bearing ring is manufactured conventionally to define a forward guiding flange and a rear retaining flange. However, the invention avoids the need for the unitary rear flange and instead replaces this with a removable retainer element. In part, this is possible because the rear flange is not subject to the same high loads as the main guiding flange. The retainer element can therefore be made from lower strength materials than the hardened bearing steel of the bearing ring.

The retainer element may be positioned and fixed onto the bearing ring in various ways. In one embodiment, the retainer element is removably engageable with an engagement feature defined by the bearing ring. The engagement feature therefore sets the retainer element in a fixed position so it is able to retain the rolling elements on the raceway of the bearing ring in use.

So that the retaining element can be fixed onto the bearing ring in different positions, in one embodiment the bearing ring may define a plurality of engagement features different axial positions along the raceway. The engagement features may take various forms, for example in one embodiment the engagement feature may include one or more recesses; those recesses may include circumferential slots.

The engagement feature may be shaped to accept or receive a least a portion of a respective retainer element. Therefore, this would leave another portion of the retainer element protruding from the engagement feature.

The retainer element may be configured and shaped to define a contact face that is spaced from the engagement feature along the direction of the raceway. This may be achieved by a retainer element that has a longitudinal cross section in the form of an elbow or L-shape. In this way, different sized retainer elements may set a different raceway widths.

Although the invention is directed to components of a bearing assembly that are applicable to many applications, the invention has particular usefulness in the field of wind turbines, and so also embraces a main rotor arrangement for a wind turbine, comprising a main rotor shaft which is rotatably supported in a main shaft housing by a bearing arrangement, said bearing arrangement comprising at least one roller bearing assembly as defined above. Furthermore the invention may also be expressed as a utility-scale wind turbine comprising a tower, a nacelle mounted to the tower, a hub connected to a plurality of wind turbine blades, wherein the hub is mounted to a main rotor arrangement as defined above.

Finally, the invention can be considered to be embodied in a bearing kit comprising a first bearing ring as defined above, a complementary bearing ring that, together with the first bearing ring, form a bearing cup and bearing cone of a bearing assembly, and a plurality of rolling elements, wherein the plurality of rolling elements are grouped into two or more sets of rolling elements, the rolling elements of each set having different dimensions to the rolling elements of the other set of rolling elements, and wherein one or more retainer elements of the bearing kit is configurable to selectably define two or more raceway widths that compliment respective ones of the sets of rolling elements.

The main rotor arrangement of the invention is to be considered in the context of a utility-scale wind turbine, which would typically have a power rating of at least 1 MW and often considerably higher than this. The invention therefore extends to such a wind turbine comprising a main rotor arrangement in accordance with the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Embodiments of the invention will now be described, by way of example only, with reference to the accompanying drawings, in which.

DETAILED DESCRIPTION

This description relates to a configuration of a roller bearing assembly that allows for increased manufacturing efficiency. Also it provides more flexibility in configuring a bearing assembly for a particular industrial application. The roller bearing assembly of the invention permits the width of its raceway to be configured in a way that does not require machining of the inner ring to define the raceway width. In the illustrated embodiments, this is achieved by the use of a removable retainer element that is engageable with the raceway to retain the roller elements in the bearing assembly. The invention exploits the fact that the bearing retainer element is not subject to high axial forces in use since the thrust forces of the bearing are absorbed by the load flange at a front face of the bearing. The loading on the retainer element is therefore relatively low and it may even be the case that the rollers do not impose any load on the retainer element. The retainer element does not therefore need to be made from very strong bearing steel but can instead be made from more cost effective materials. This configuration also allows for retainer elements to be made with different forms in order to establish different raceway widths on a single inner ring. In this way, a single inner ring component could be made that is suitable for different sizes of rolling elements and outer rings. It will be appreciated therefore that this allows a single inner ring to be machined that is suitable for different sizes of bearing assembly which increases manufacturing efficiency.

Turning to the illustrated embodiments, the technical context of the invention will firstly be explained with reference to FIGS. 1 to 6.

Figure 1:
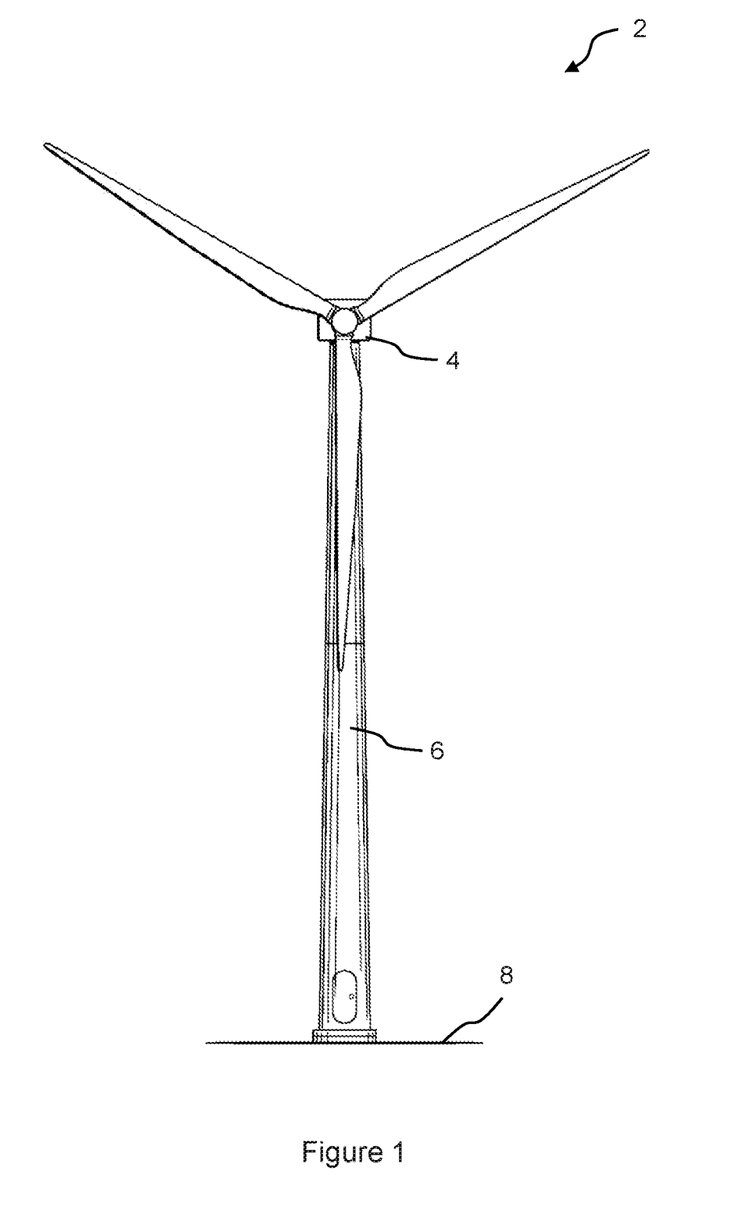
FIG. 1 is a front view of a wind turbine, comprising a main rotor arrangement according to the invention.

With reference to FIG. 1, a wind turbine 2 includes a nacelle 4 that is supported on a generally vertical tower 6, which is itself mounted to a foundation 8. The foundation 8 may be on the land, or wholly or partially underwater. The nacelle 4 houses a number of functional components, some of which are shown schematically in FIG. 2, by way of example. Such a configuration would be well known to a skilled person.

Here, the nacelle 4 is shown as housing at least in part, the main rotor arrangement 10, a gearbox 12 and a generator 14. For brevity, some typical components have been omitted from FIG. 2 as they are not central to this discussion, for example a power converter and yaw drive. However, the presence of such components is implicit and such components would be well understood by the skilled reader.

Figure 2:
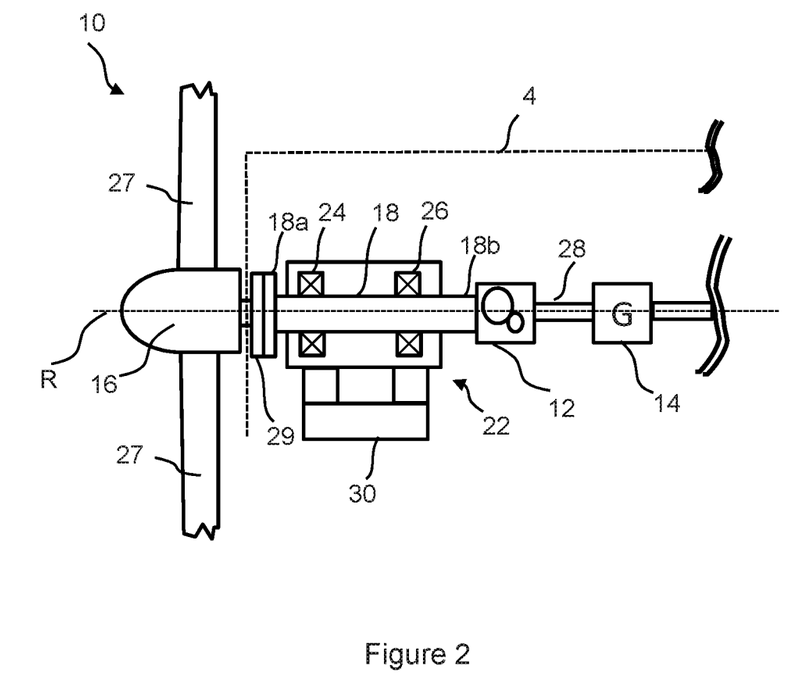
FIG. 2 is a schematic view of a drivetrain of the wind turbine of FIG. 1, including a main rotor arrangement.

The main rotor arrangement 10 includes a hub 16 coupled to a main rotor shaft 18, which is rotatably supported in a main shaft housing 20 by a bearing arrangement 22. Note that the main shaft housing 20 sometimes is referred to in the art as a "main bearing housing", and will be referred to as such from now on. In this embodiment, the bearing arrangement 22 comprises a forward bearing 24 and a rear bearing 26. The hub 16 is connected to a plurality of rotor blades 27, although three blades are typical in a HAWT. The blades 27 are acted on by the wind and therefore torque is applied by the hub 16 to the main rotor shaft 18 which causes it to rotate within a main bearing housing 20.

An input or 'forward' portion of the main rotor shaft 18 comprises a flange 18a, by which means the main rotor shaft 18 is connected to the hub 16 so it can be driven by torque produced by the blades. Here the flange 18a is shown as being connected to a further flange 29 that is associated with the hub 16, such that the two flanges form a coupling between the hub 16 and the main rotor shaft 18. The flange 18a can therefore be considered to be at the hub-connection end of the main rotor shaft 18. Note that the flange type coupling is exemplary only; other hub and main shaft arrangements may be apparent to the skilled person.

An output portion 18b of the shaft 18 provides input drive to the gearbox 12. The gearbox 12 steps up the rotational speed of the main rotor shaft 18 via internal gears (not shown) and drives a high-speed gearbox output shaft 28. The high-speed output shaft 28 in turn drives the generator 14, which converts the rotation of the high-speed output shaft 28 into electricity. The electrical energy generated by the generator 14 may then be converted by other components (not shown here) as required before being supplied to the grid, for example, or indeed any electrical consumer. So-called "direct drive" wind turbines that do not use gearboxes are also known. The gearbox 12 may therefore be considered optional. As has been mentioned, this general system architecture is conventional and would be well understood by the skilled person. However, it provides useful context to the invention.

At this point it should be noted that although in this embodiment two support bearings 24, 26 are shown that provide support to the main rotor shaft 18 at forward and rearward positions, arrangements are also known in which the rearward bearing is omitted and, instead, rear support for the main rotor shaft 18 may be provided by the generator 14.

The main bearing housing 20 is supported on a base frame 30, which can also be known as a bed plate. Although not shown here, the base frame 30 may be coupled to a yaw drive at the upper part of the wind turbine tower 6 to enable the base frame 30 and, thus, the entire nacelle 4 to yaw with respect to the tower 6 so as to enable the direction of the hub 16 to be adjusted with respect to the wind direction.

The base frame 30 is typically a cast component, for example of steel or iron, and has the function to transfer the loads from the main shaft 18, through the bearings 24, 26, the main bearing housing 20, and the base frame 30, and into the wind turbine tower 6.

Figure 3:
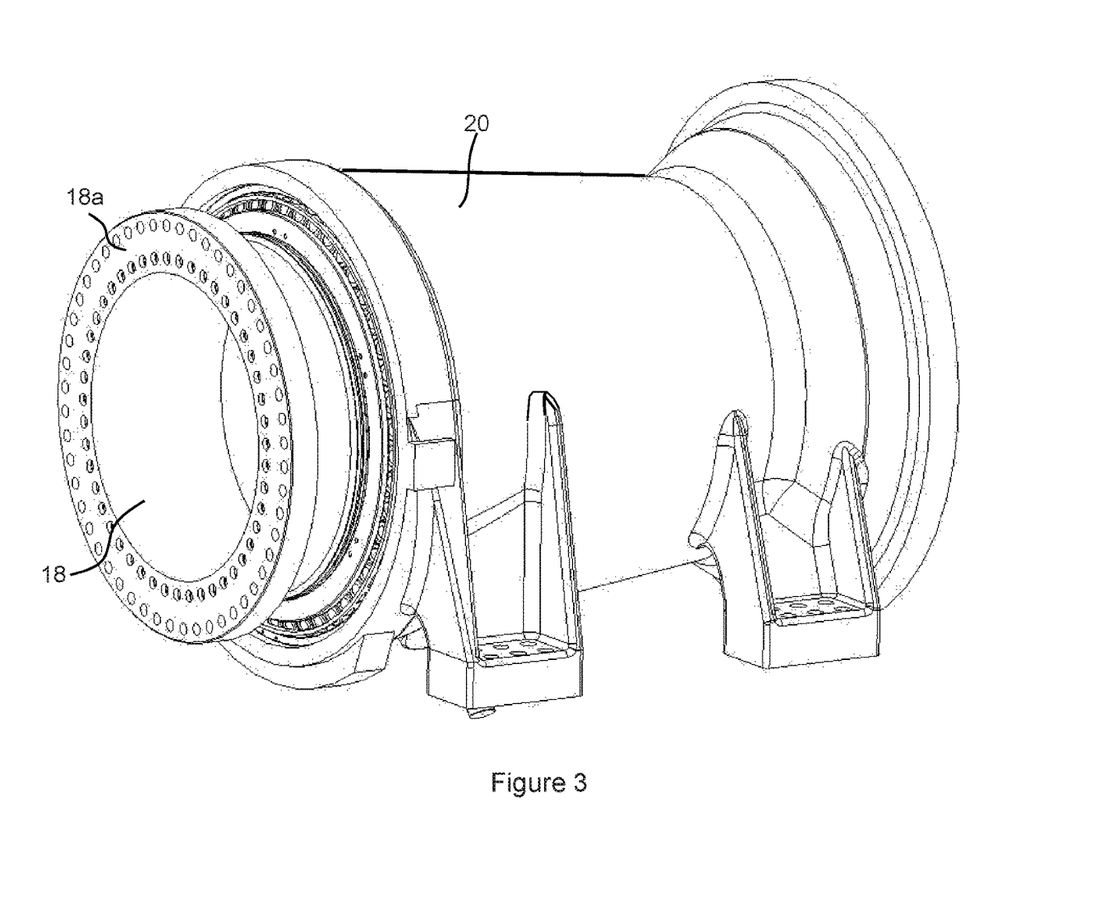
FIG. 3 is a perspective view of a main rotor arrangement.
Figure 4:
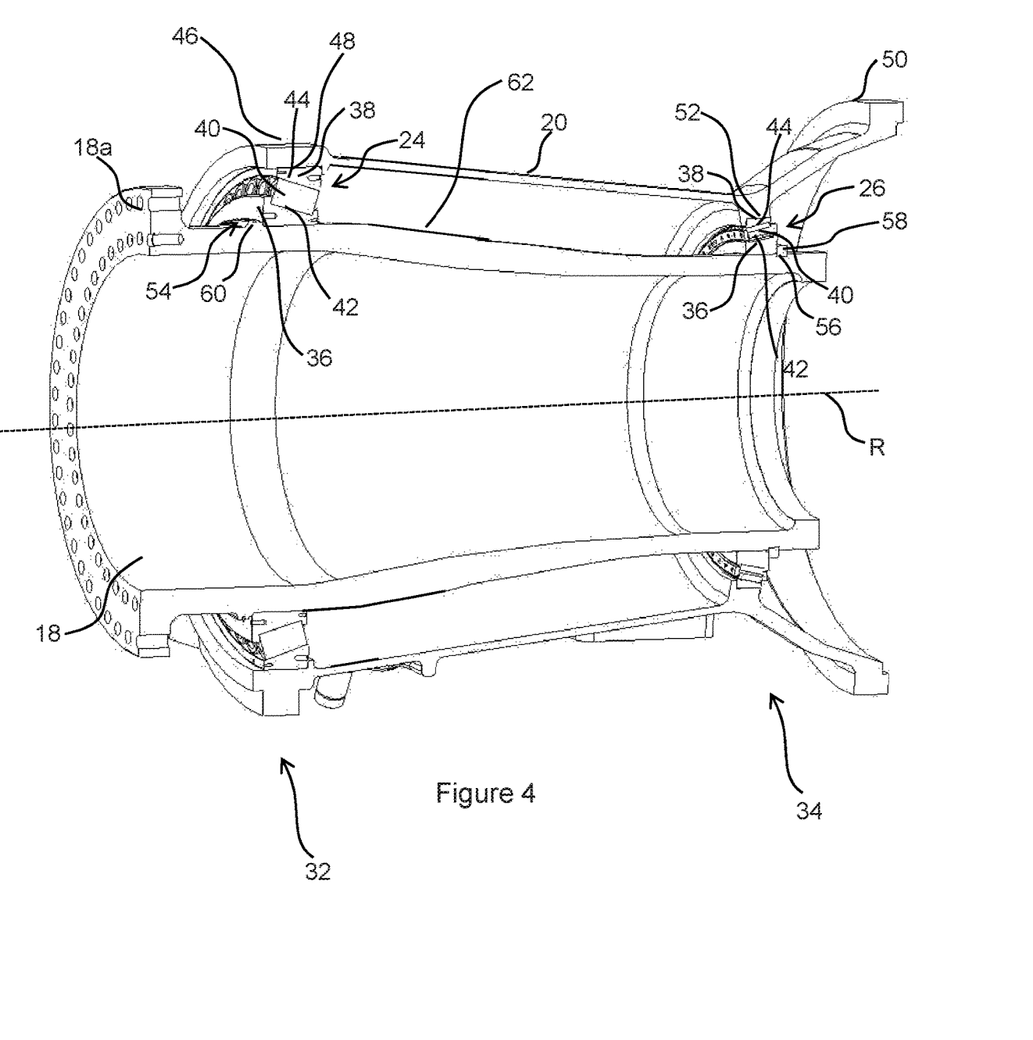
FIG. 4 is a longitudinal section view of the main rotor arrangement comprising known arrangements of main shaft and main bearings.

Whereas FIG. 2 was schematic in nature to show a general arrangement of components, FIGS. 3 and 4 illustrate a more practical realisation of a main bearing housing 20 and main rotor shaft 18 for a better understanding of the configuration of the relevant components. It should be noted that whilst the general layout of the main bearing housing 20 and main rotor shaft 18 shown in FIGS. 3 and 4 is applicable to the present invention, the main inventive concept is not illustrated in these drawings, but will be described later with particular reference to FIGS. 7 to 10. However, FIGS. 3 and 4 should assist in providing useful context for the invention. Note that the same reference numerals are used to denote components corresponding to those in FIG. 2.

Referring to FIGS. 3 and 4, the main rotor shaft 18 is tapered along its length to provide a relatively larger circumference at the forward end 32 of the shaft 18 and a relatively smaller circumference at the rearward end 34 of the shaft 18. It should be noted that it is not essential that the main rotor shaft 18 is tapered. However, this configuration may provide certain advantages as it allows the shaft 18 to support a larger forward bearing 24, capable of managing more effectively the substantial loads to which it is subjected, in use. A typical wind turbine bearing for use in utility-scale applications, typically exceeding 1 MW in power output, must withstand high loads and operate reliably over an extended lifetime.

The forward and rear bearings 24, 26 are situated between the main rotor shaft 18 and main bearing housing 20, at forward and rearward positions, respectively, along the length of the shaft 18. The forward and rear bearings 24, 26 together enable the main rotor shaft 18 to rotate freely with respect to the main bearing housing 20 during operation of the wind turbine, about a rotor axis R that extends through the centre of the main rotor shaft 18.

The forward and rear bearings 24, 26 each include an inner ring 36, an outer ring 38 and a plurality of generally cylindrical rolling elements 40, more simply referred to as rollers, supported between the rings. Note that the inner ring 36 may sometimes be referred to in the art as a cone, whereas the outer ring 38 may sometimes be referred to as a cup. Such terminology would be familiar to the skilled person.

In this embodiment, the forward and rear bearings 24, 26 are tapered roller bearings having tapered inner and outer bearing tracks or "races" 42, 44 and tapered rolling elements 40 designed to accommodate combined axial and radial loads. In other embodiments, different types of bearings may be used, for example cylindrical roller bearings (not shown) or spherical bearings. Cylindrical roller bearings utilise rows of cylindrical rolling elements that are in linear contact with races of the inner and outer rings.

The main bearing housing 20 comprises a front flared portion 46 that defines a forward bearing seat 48 and a rear flared portion 50 that defines a rear bearing seat 52. To secure the bearings 24, 26 in position, the main rotor shaft 18 includes a forward bearing retaining rib 54 which fixes the forward bearing 24 in the forward bearing seat 48 and a rear bearing retainer groove 56 for holding a backing element such as a rear bearing clip 58, circlip, lock nut or similar structure that retains the rear bearing 26 in the rear bearing seat 52.

The forward retaining rib 54 is in the form of a protrusion that extends radially outwards from an outer surface 62 of the main rotor shaft 18, and extends about the entire circumference of the main rotor shaft 18. This retaining rib 60 includes an abutment surface (not shown) facing away from the forward (hub) end 32 of the shaft 18, against which a corresponding abutment surface (not shown) of the inner ring 36 of the forward bearing 24 contacts in use.

In this way, the forward bearing 24 is located at the correct position along the length of the shaft 18, and is prevented from being pushed towards the hub-end 32 of the shaft 18 during operation. In operation, the forces on the forward bearing 24 generally urge the bearing towards the front end of the shaft 18.

The present invention relates in more details to specific designs of a bearing, which could for instance be the forward or rear bearings 24, 26 as described above. In the following description, focus will be on one single bearing for simplification.

Figure 5:
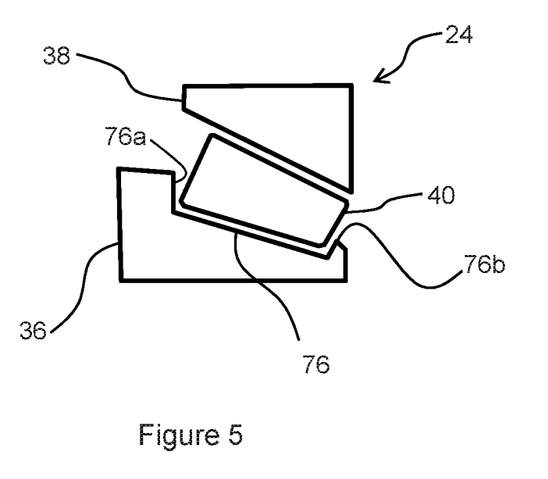
FIGS. 5 and 6 are illustrative views of components of a known configuration of a roller bearing.
Figure 6:
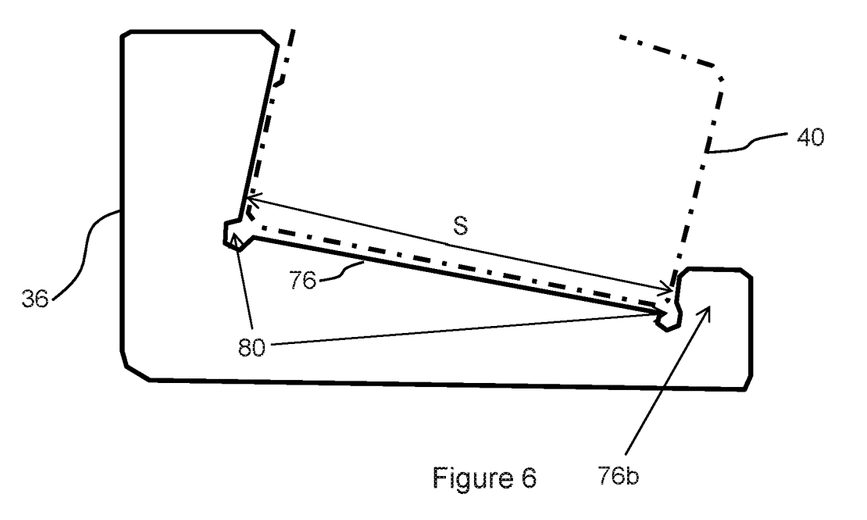

Firstly, a known arrangement of a tapered roller bearing will be described. Reference will be made to FIGS. 5 and 6 using reference numerals for consistency with FIGS. 3 and 4. Here, the inner ring 36 of the forward bearing 24 comprises an inclined radially outer surface 76 defining an inner ring raceway or track in which the rolling elements 40 of the inner ring 36 are received and guided between a front 'guiding' flange or wall 76a and a rear 'retaining' flange or wall 76b. Due to the way in which tapered roller bearings work, the bearing is subject to radial forces, but also axial forces which act in the direction of the guiding flange 76a. The guiding flange therefore is thicker and thus stronger than the retaining flange 76b in order to bear sustained heavy loading. The retaining flange 76b may also be labelled a rib. This rib, as well as the larger rib (front guiding flange) on the opposite side, is typically machined. For TRBs the small retaining rib is used for keeping and supporting the roller set, but no loads are transferred due to the conical shape of the rollers.

FIG. 6 is similar to FIG. 5, but is an enlarged view of the inner ring 36, with the rolling element 40 shown in dashed lines. It will be appreciated that the distance between the guiding flange 76a and the retaining flange 36b defines the width of the raceway along which the rolling element 40 travels. This width dimension is labelled as 'S' on FIG. 6 and it is noted that this dimension corresponds generally to the axial length of the rolling elements. In the inner ring 36 shown in FIG. 6, the raceway 76 is bounded on its front and rear edges by pockets 80 which are artifacts of the machining process used to grind the raceway 76 onto the inner ring 36.

From the previous discussion of the known configuration of the inner ring 36, it will be appreciated that the entire inner ring is manufactured from a single block of material, typically bearing steel, by a machining process that involves cutting the raceway into the inner ring and thereby forming and shaping the front and rear flanges. This procedure defines the distance S between the front and rear flanges and so is suitable for one size of rolling elements. It follows therefore that a different configuration of inner ring must be designed and manufactured for different sized rolling elements that might be needed for a different application.

The embodiments of the invention provide a roller bearing assembly, and in particularly an inner ring component, that addresses this issue.

Figure 7:
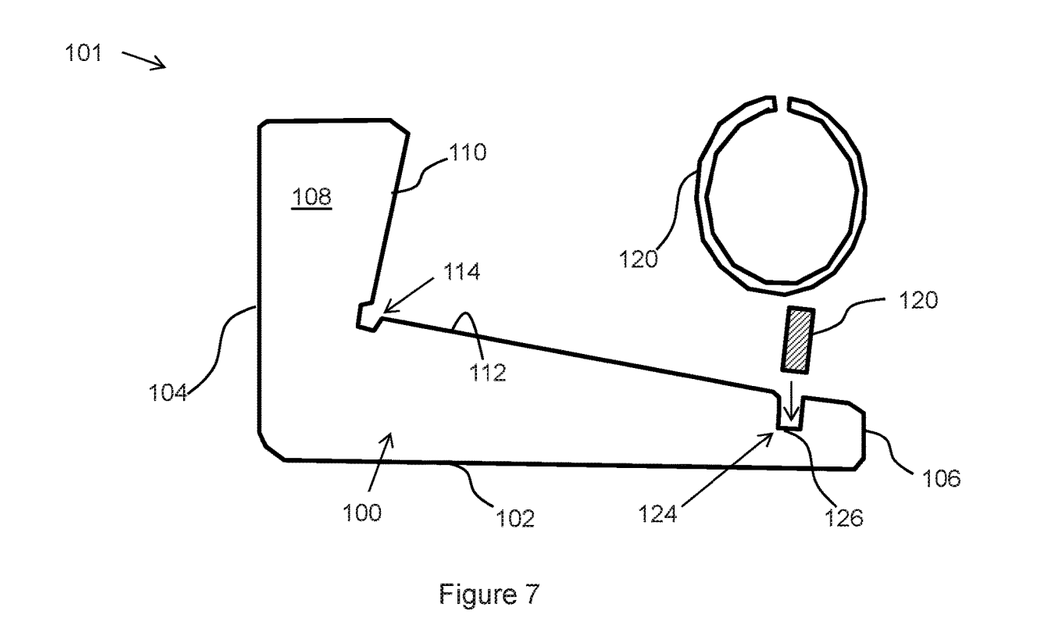
FIGS. 7 and 8 are illustrative views of components of a roller bearing in accordance with a first embodiment of the invention.
Figure 8:
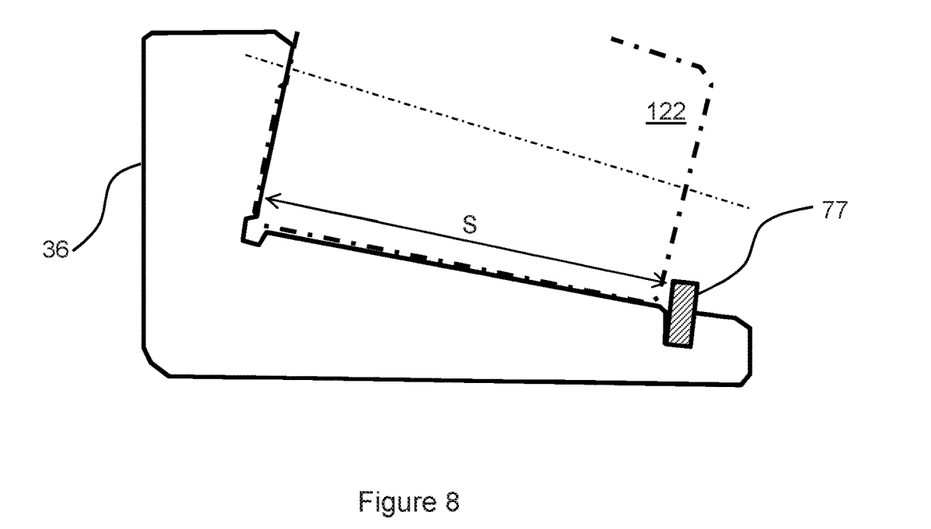

FIGS. 7 and 8 show an inner ring 100 of a roller bearing assembly 101 in accordance with an embodiment of the invention. The focus is on the inner ring 100 although it should be appreciated that a complete roller bearing assembly would also include an outer ring.

As is conventional, the inner ring 100 or 'cone' comprises an annular body of material, for example bearing steel, that has a radial inner face 102, an axially forward face 104 and an axially rearward face 106. The axially forward face 104 forms part of a forward rib or wall 108 of the inner ring 100 which thereby defines a guiding flange 110.

An inclined track or raceway 112 extends between a base 114 of the guiding flange 110 and the rear face 106 of the inner ring 100. As such, the raceway 112 is a circumferential surface along which a rolling element 116 is able to travel in use.

Comparing and contrasting the inner ring 100 with the inner ring 36 of the known arrangement described previously, the absence of the rear retaining rib will be conspicuous. Instead of an integral retaining rib as in the known arrangement, the inner ring 100 of the illustrated embodiment comprises a retainer element 120 that is removably engageable with the raceway 112.

The removable retainer element 120 is engageable with the raceway 112 in a position so as to define a width dimension 'S' of the raceway 112 which is the required width for the type of rolling element 122 which is intended to be used with the bearing assembly 101. The retainer element 120 fulfils the same purpose of keeping the rolling elements 122 in place. As mentioned above, the conical shape of the rolling elements 122 ensures no transfer of loads, so the retainer element 120 does not have to be able to withstand large forces. Therefore, the retainer element may be made from a wider range of materials that the inner ring, for example materials that are different to bearing steel, such as sintered materials, spring steel material, and non-metallic materials such as engineering plastics.

In this embodiment the retainer element 120 is an annular element in the form of a snap ring or circular clip (circlip), as can be seen in FIG. 7. The inner dimension of the retainer element 120 can therefore be dilated as it is received onto the inner ring 100. It is envisaged that the retainer element 120 could be fixed in position on the inner ring 100 using different engagement features, but in this embodiment, the retainer element 100 is engageable with an engagement feature or formation 124 that is in the form of an annular or circumferential recess such as a slot or groove 126 that receives at least a portion of the retainer element 120. The depth of the slot is configured to be less than the depth of the retainer element 120 so that a significant portion of the retainer element 120 protrudes from the slot when in the engaged position.

Instead of a slot, the retainer element 120 could include a series of locating pins that could cooperate with a corresponding series of location recesses. However, at present a locating feature in the form of a slot or groove 126 is considered an elegant solution.

The principle of the removable retainer element 120 has other advantages over and above ease of manufacturing. For example, the axial position of the slot along the raceway 112 may be machined in a different position in order to accommodate different sizes of roller elements. Therefore, a single basic design of inner ring would be able to be finished with a relatively simple machining process to cut a circumferential slot in the required position. The same design of inner ring could therefore be used in different sized bearing assemblies for a variety of loading applications.

Figure 9:
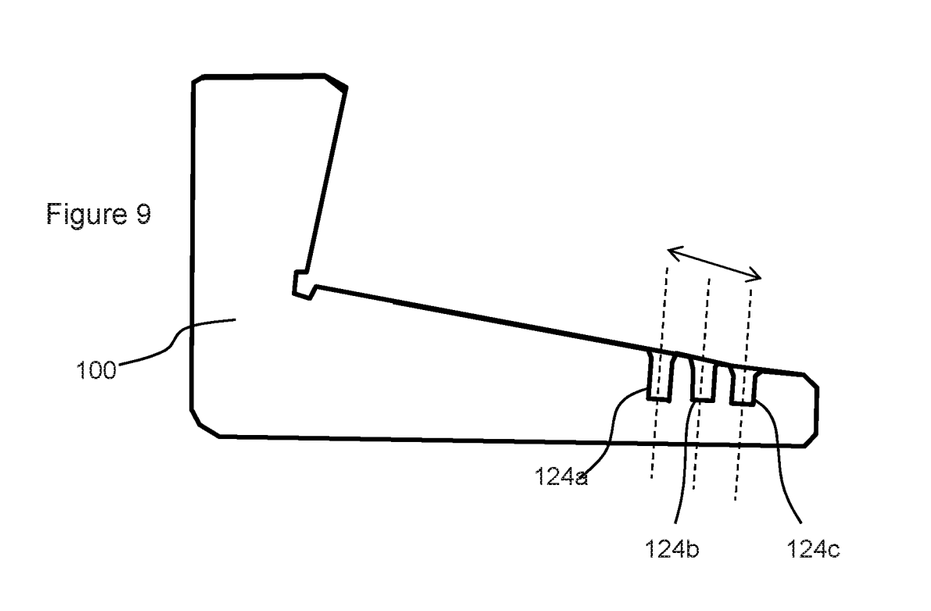
FIG. 9 is an illustrative view of components of a roller bearing in accordance with another embodiment of the invention.

FIG. 9 shows an embodiment which illustrates the point above. The figure is fundamentally the same inner ring configuration as shown in FIG. 8 and so only the differences will be described. Here, the flexibility of the inner ring 100 is apparent as it is prepared with three circumferential grooves 124a, 124b, 124c, which means that the same inner ring 100 can be used with three different lengths of the rolling elements 40 by the use of a retainer element 120 in a selected one of the grooves.

Of course, instead of three slots 124a-c, the inner ring 100 may be made with a slot in a selected position specific to the size of rolling element that is required for a particular application.

Figure 10:
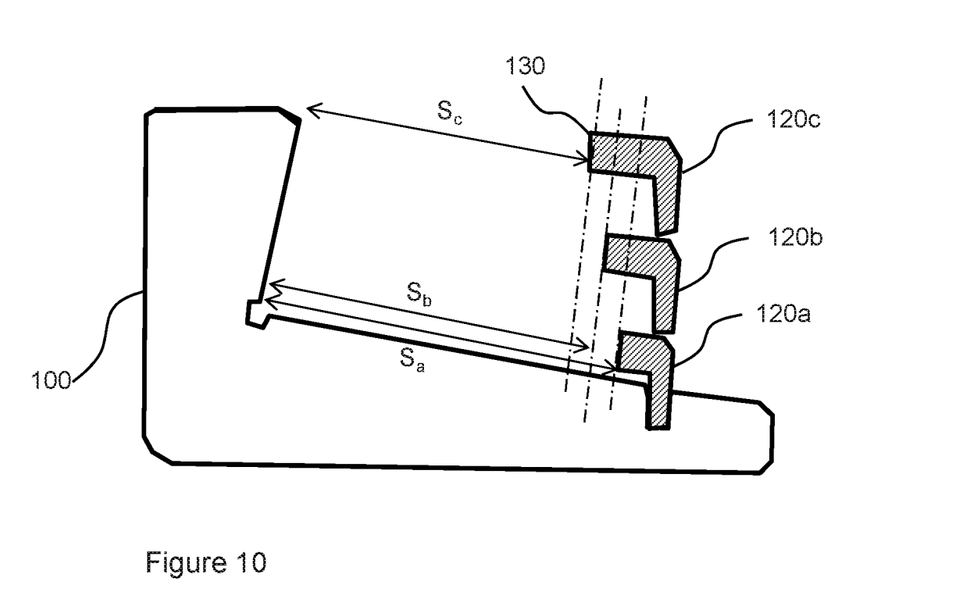
FIGS. 10 and 11 are illustrative views of components of a roller bearing in accordance with further embodiments of the invention.

FIG. 10 illustrates an alternative embodiment which provides the same flexibility over the size of rolling element that may be used with the inner ring 100. Here, the inner ring 100 includes only one circumferential slot 124, similar to that which is shown in FIG. 8, but a retainer element is chosen to fit the desired and chosen length of the rolling elements. To this end, the retainer element 120 has a cross-section profile that is generally L-shaped. Therefore, a vertical portion of the retainer element 120 engages with the slot 124, whilst a horizontal portion or 'arm' of the retainer element 120 extends in a direction along the raceway to define a contact surface 130 that is spaced a predetermined distance from the slot 124. The length of the arm portion can therefore be configured to define a required width of raceway when the retainer element 120 is engaged in the slot 124. This is illustrated by three different retainer elements 120a-120c, each of which extends to a different axial position along the raceway so as to define three different rolling element lengths, Sa, Sb and Sc, respectively.

Figure 11:
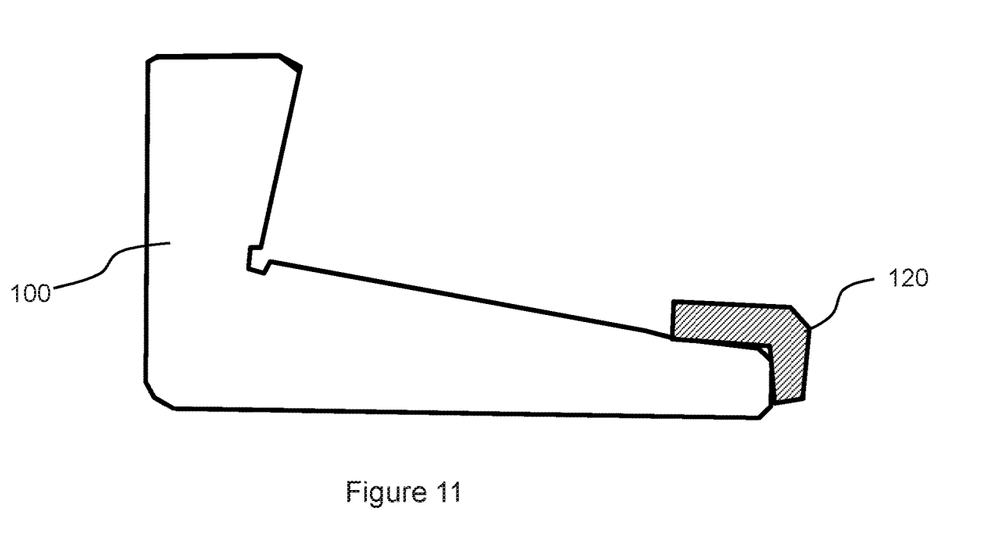

In the above embodiments, the retainer element is fixed into the circumferential slot 124 of the inner ring 100. However, embodiments are envisaged where a slot in the inner ring is not required. Instead the retainer element may be configured to define a tight fit onto the smaller diameter rearward face 106. In such a case, the rearward face 106 of the inner ring becomes the engagement feature for the retainer element 120. FIG. 11 shows an example of this. Alternatively the retainer element 120 may be mounted on the rearward face 106 and secured to it by an appropriate technique—for example by retaining clips of bolts.

It should be noted that the bearing assembly in practice would also include a roller cage that keeps the rolling elements in a spaced configuration about the circumference of the cup and cone of the bearing assembly, although this feature is not illustrated here for clarity. Note that in some embodiments the roller cage may envelop the rolling elements so that it is the roller cage that abuts the guiding flange and the retainer element.

It should be noted that in the examples shown, it is the inner ring which enables the variability of the size of rollers, since it is the inner ring that usually handles the bearing loads applied to the bearing assembly. The skilled reader will appreciate that the invention provides for multiple different bearing assemblies to be configured using the same basic inner ring, but configured with different sized roller sets, and perhaps also matched with an appropriately sized outer ring, for a certain application. A bearing kit could therefore be provided that would comprise an inner ring, different sets of rolling elements, one or more retainer elements that are matched with the different sets of rolling elements, and one or more outer rings, as appropriate.

It should be noted that the specific embodiments described above represent examples of how the inventive concept may be implemented. The skilled person would appreciate that the embodiments could be modified without departing from the inventive concept as defined by the claims.

For example, although the embodiments described above focus on a taper roller bearing, it should be noted for the avoidance of doubt that the invention also applies to other types of bearings for example cylindrical roller bearings and spherical roller bearings.

The invention claimed is:

1. A bearing ring for a roller bearing defining a guiding flange and a raceway, the bearing ring comprising a retainer element that is removably engageable with a plurality of engagement features that are defined at different axial positions along the raceway.

2. A bearing, comprising:
a bearing ring defining a guiding flange and a raceway configured to support a roller bearing; and
a retainer element that is removably engageable with the raceway to selectively define two or more raceway widths for the raceway;
wherein each of the two or more raceway widths are a fixed width configured to receive a correspondingly sized roller bearing therein.

3. The bearing ring of claim 2, wherein the retainer element is removably engageable with at least one engagement feature defined by the bearing ring.

4. The bearing ring of claim 3, wherein the bearing ring defines a plurality of engagement features that are defined at different axial positions along the raceway.

5. The bearing ring of claim 3, wherein the at least one engagement feature comprises one or more recesses defined in the raceway.

6. The bearing ring of claim 5, wherein the one or more recesses is an annular slot that extends circumferentially around the raceway.

7. The bearing ring of claim 5, wherein the one or more recesses are shaped to receive at least a portion of a respective retainer element.

8. The bearing ring of claim 2, wherein the retainer element is a circlip.

9. The bearing ring of claim 2, wherein the retainer element is shaped to define a contact surface that is spaced from the engagement feature along the direction of the raceway.

10. The bearing ring of claim 2, wherein the retainer element has a generally L-shaped radial cross-section.

11. The bearing ring of claim 2, wherein the retainer element is made from a material that is different from bearing steel.

12. The bearing ring of claim 11, wherein the retainer element is made of a non-metallic material.

13. A roller bearing assembly comprising an inner ring, an outer ring, and a plurality of rolling elements, wherein at least one of the inner ring or the outer ring is the bearing ring as claimed in claim 2.

14. A main rotor arrangement for a wind turbine, comprising:
a main rotor shaft which is rotatably supported in a main shaft housing by a bearing arrangement, said bearing arrangement comprising the at least one roller bearing assembly as claimed in claim 13.

15. A utility-scale wind turbine comprising a tower, a nacelle mounted to the tower, a hub connected to a plurality of wind turbine blades, wherein the hub is mounted to the main rotor arrangement as claimed in claim 14.

16. A bearing kit comprising the bearing ring as claimed in claim 2, a complementary bearing ring that, together with the bearing ring, form a bearing cup and bearing cone of a roller bearing assembly, and a plurality of rolling elements, wherein the plurality of rolling elements are grouped into two or more sets of rolling elements, the rolling elements of each set having different dimensions to the rolling elements of the other set of rolling elements, and wherein the retainer element of the bearing kit is configurable to selectably define two or more raceway widths that match respective ones of the sets of rolling elements.

17. A bearing kit, comprising:
a bearing ring for a roller bearing defining a guiding flange and a raceway, the bearing ring comprising a retainer element that is removably engageable with the raceway; and
a complementary bearing ring that, together with the bearing ring, form a bearing cup and bearing cone of a roller bearing assembly, and a plurality of rolling elements, wherein the plurality of rolling elements are grouped into two or more sets of rolling elements, the rolling elements of each set having different dimensions to the rolling elements of the other set of rolling elements, and wherein the retainer element of the bearing kit is configurable to selectably define two or more raceway widths that match respective ones of the sets of rolling elements.

18. A bearing, comprising:
a bearing ring defining a guiding flange and a raceway configured to support a roller bearing; and
a plurality of retainer elements of varying sizes that are each configured to engage with the raceway to selectively define two or more raceway widths;
wherein the two or more raceway widths correspond to two or more different sized roller bearings.

* * * * *